(12) United States Patent
Zhang et al.

(10) Patent No.: US 10,409,444 B2
(45) Date of Patent: Sep. 10, 2019

(54) HEAD-MOUNTED DISPLAY INPUT TRANSLATION

(71) Applicant: Microsoft Technology Licensing, LLC, Redmond, WA (US)

(72) Inventors: Jiashi Zhang, Issaquah, WA (US); Alexandre Alberto Coelho, Redmond, WA (US); Daniel Vincent Draper, Seattle, WA (US); Christopher M. Weidman, Sammamish, WA (US); Christopher Michael Becker, Bellevue, WA (US); Robert James Jarrett, Seattle, WA (US); Nazeeh Amin Eldirghami, Redmond, WA (US); Joshua Erik Walton, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 10 days.

(21) Appl. No.: 15/806,255

(22) Filed: Nov. 7, 2017

(65) Prior Publication Data
US 2019/0073109 A1 Mar. 7, 2019

Related U.S. Application Data

(60) Provisional application No. 62/553,731, filed on Sep. 1, 2017.

(51) Int. Cl.
*G06F 3/0481* (2013.01)
*G06F 3/038* (2013.01)
(Continued)

(52) U.S. Cl.
CPC ...... *G06F 3/04812* (2013.01); *G06F 3/04815* (2013.01); *G06F 3/04842* (2013.01);
(Continued)

(58) Field of Classification Search
CPC ............ G06F 3/04812; G06F 3/04815; G06F 3/03543; G06F 3/038; G06F 3/04842; G06F 3/04845; G06T 19/006
(Continued)

(56) References Cited

U.S. PATENT DOCUMENTS

2013/0293447 A1* 11/2013 Bickerstaff .......... G02B 27/646
345/8
2015/0015458 A1* 1/2015 Cho ...................... G02B 27/017
345/8
(Continued)

OTHER PUBLICATIONS

Kariuki, David, "Space VR app offers virtual deskto", Retrieved From <<http://www.hypergridbusiness.com/2016/06/space-vr-app-offers-virtual-desktop/>>, Jun. 29, 2016, 2 Pages.
(Continued)

*Primary Examiner* — Stephen G Sherman
(74) *Attorney, Agent, or Firm* — Alleman Hall Creasman & Tuttle LLP

(57) ABSTRACT

Computing devices, head-mounted display devices and methods for processing spatial input signals from a pointing device are disclosed. In one example, a pointer is displayed within a desktop window that represents an operating system shell generated by a computing device. The desktop window and the pointer are displayed via a head-mounted display device within a three-dimensional environment. Spatial input signals are received from the pointing device and are translated into two-dimensional motion of the pointer within the desktop window. Based on determining that a location of the pointer moves outside the desktop window, the spatial input signals are translated into three-dimensional motion of the pointer within the three-dimensional environment displayed via the head-mounted display device.

19 Claims, 15 Drawing Sheets

(51) Int. Cl.
 *G06F 3/0484* (2013.01)
 *G06T 19/00* (2011.01)
 *G06F 3/0354* (2013.01)

(52) U.S. Cl.
 CPC .......... *G06F 3/038* (2013.01); *G06F 3/03543* (2013.01); *G06F 3/04845* (2013.01); *G06T 19/006* (2013.01)

(58) Field of Classification Search
 USPC ............................................................ 345/8
 See application file for complete search history.

(56) References Cited

U.S. PATENT DOCUMENTS

| | | |
|---|---|---|
| 2016/0267712 A1 | 9/2016 | Nartker et al. |
| 2016/0350972 A1 | 12/2016 | Kauffmann et al. |
| 2017/0052373 A1* | 2/2017 | Memmott .......... G02B 27/0172 |
| 2017/0060514 A1 | 3/2017 | Kaufthal |

OTHER PUBLICATIONS

"App views", Retrieved From <<https://developer.microsoft.com/en-us/windows/mixed-reality/app_views>>, Retrieved Date: Aug. 11, 2017, 3 Pages.

Pop, Sebastian, "Touch and Move 3D Objects on This Transparent Hologram Computer—Video", Retrieved From <<http://news.softpedia.com/news/Touch-and-Move-3D-Objects-On-This-Transparent-Computer-342451.shtml>>, Apr. 3, 2013, 3 Pages.

Hunt, Cale, "How to use your desktop in VR", Retrieved From <<https://www.vrheads.com/using-your-desktop-vr>>, Jul. 25, 2017, 10 Pages.

Hardawar, Devindra, "Virtual Desktop for VR is a glimpse at a future without monitors", Retrieved From <<https://www.engadget.com/2016/04/18/virtual-desktop-vr-windows/>>, Apr. 18, 2016, 5 Pages.

Williams, Chris, "Microsoft to overhaul Windows 10 UI—with a 3D Holographic Shell", Retrieved From <<https://www.theregister.co.uk/2016/08/16/windows_10_holographic/>>, Aug. 16, 2016, 3 Pages.

\* cited by examiner

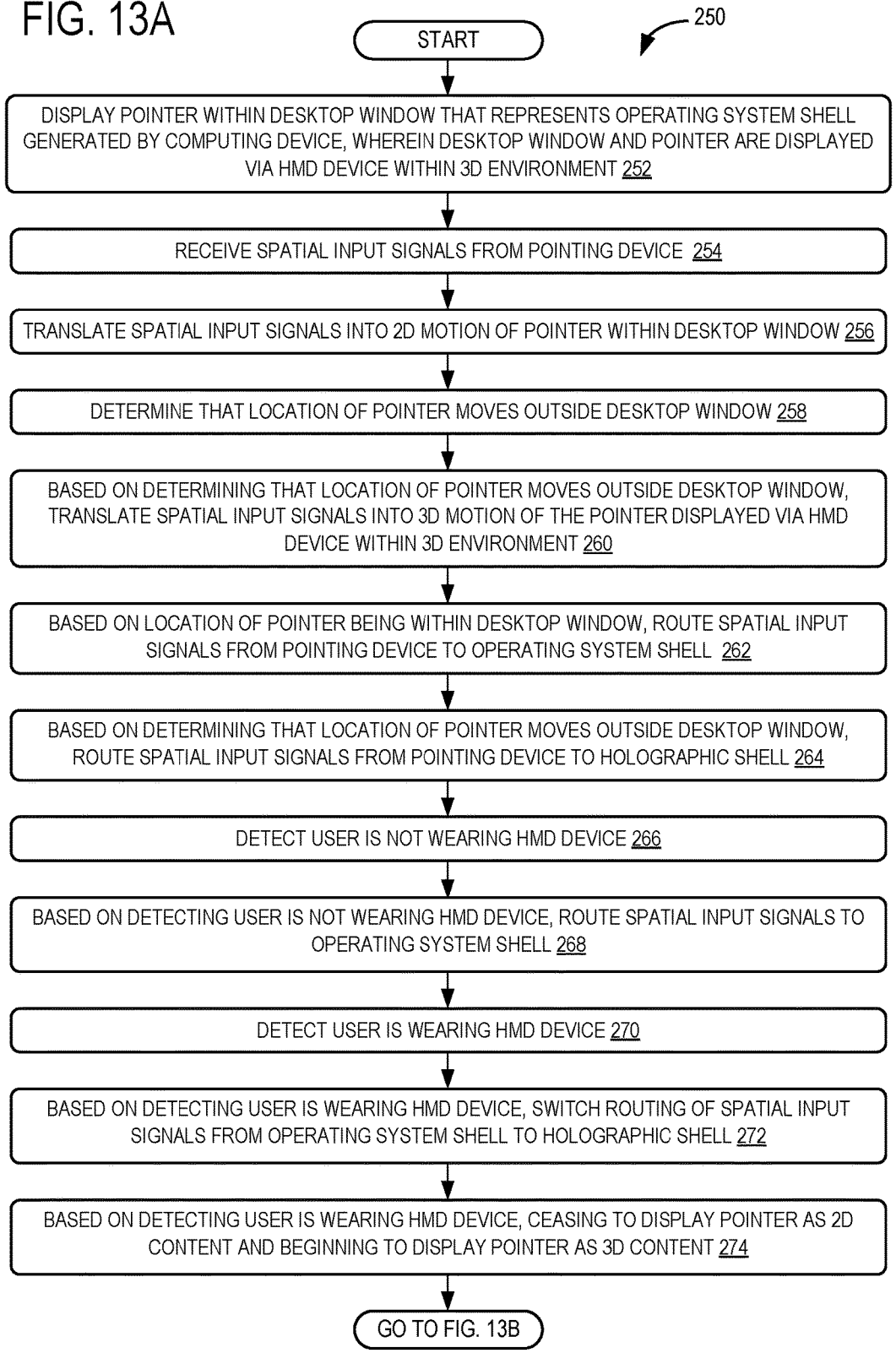

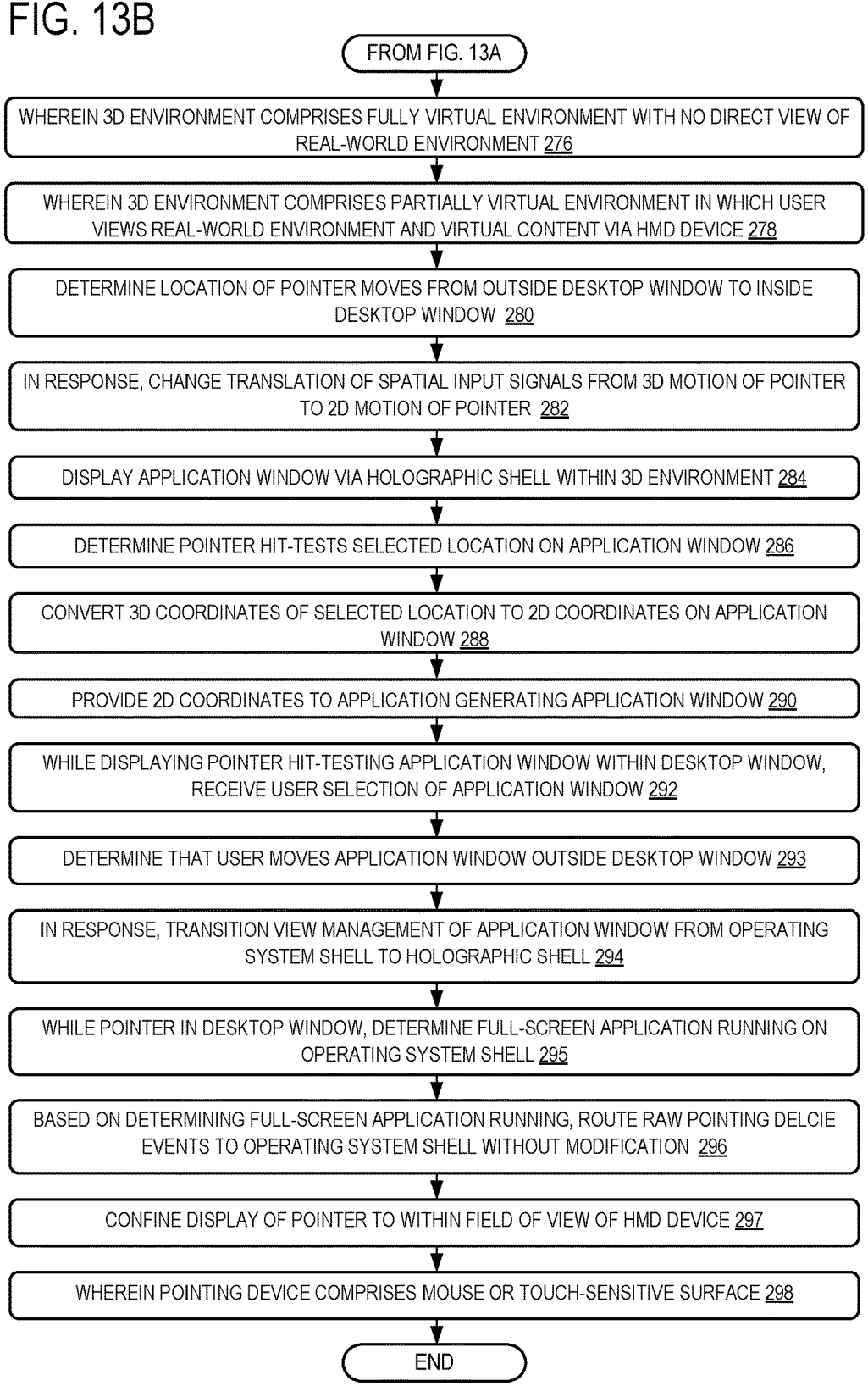

HEAD-MOUNTED DISPLAY INPUT TRANSLATION

CROSS REFERENCE TO RELATED APPLICATIONS

This application claims priority to U.S. Provisional Patent Application Ser. No. 62/553,731, filed Sep. 1, 2017, the entirety of which is hereby incorporated herein by reference.

BACKGROUND

Head-mounted display devices may receive user inputs from a pointing device, such as a mouse or touch-sensitive surface. When displaying a virtual representation of a desktop to a user, such inputs may control a pointer that may interact with elements of the desktop. However, movement of the pointer is confined to the virtual desktop representation and the user is limited to interacting with elements of the desktop. Further, desktop elements such as applications that are displayed on the desktop are also confined to the area of the desktop representation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Computing devices, head-mounted displays and methods are disclosed for processing spatial input signals from a pointing device. In one example, a pointer is displayed within a desktop window that represents an operating system shell generated by a computing device. The desktop window and the pointer are displayed via a head-mounted display device within a three-dimensional environment. Spatial input signals are received from the pointing device and are translated into two-dimensional motion of the pointer within the desktop window. Based on determining that a location of the pointer moves outside the desktop window, the spatial input signals are translated into three-dimensional motion of the pointer within the three-dimensional environment displayed via the head-mounted display device.

BRIEF DESCRIPTION OF THE DRAWINGS

FIGS. 13A and 13B are a flow chart of a method for processing spatial input signals from a pointing device according to examples of the present disclosure.

DETAILED DESCRIPTION

In various examples, a head-mounted display (HMD) device may receive image data from a computing device and display the image data within a three-dimensional environment. In some examples, an HMD device may comprise an opaque, non-see-through display that provides a virtual reality experience to the user. For purposes of the present disclosure, a virtual reality experience is provided by an HMD device that displays a fully virtual environment with no direct view of the user's real-world environment. In some examples, images of the user's real-world environment may be captured and used to display corresponding virtual objects within the virtual environment.

In some examples, an HMD device additionally or alternatively may comprise an at least partially transparent display that presents a partially virtual three-dimensional environment in which the user views her real-world environment along with virtual content displayed to appear within the environment. Examples of HMD devices that may display fully virtual and partially virtual three-dimensional environments are described in more detail below with respect to FIG. 12.

In some examples, an HMD device may display a virtual representation of an operating system shell (e.g., a desktop environment) within a fully virtual or partially virtual three-dimensional environment. The operating system shell enables the user to interact with the operating system of the computing device. For purposes of the present disclosure, such a virtual representation of an operating system shell is referred to as a desktop window.

User inputs from a pointing device, such as a mouse or touch-sensitive surface, may control a displayed pointer that may interact with elements displayed in the desktop window. In current systems, however, when the user launches the desktop environment for display via an HMD device, movement of the pointer and corresponding user interaction is limited to the desktop window. Thus, a user is prevented from using the pointing device to interact with content outside the desktop window. Additionally, desktop applications that are displaying in the desktop window also may not be moved outside the window.

The present disclosure is directed to systems and methods that enable pointing device input to freely migrate between a desktop window and virtual space, thereby enabling a user to conveniently interact with desktop and non-desktop virtual content using the pointing device. Desktop applications also may be moved into and out from of a desktop window to provide continuum between an operating system shell and a holographic/three-dimensional shell displayed by an HMD device.

Figure 1:
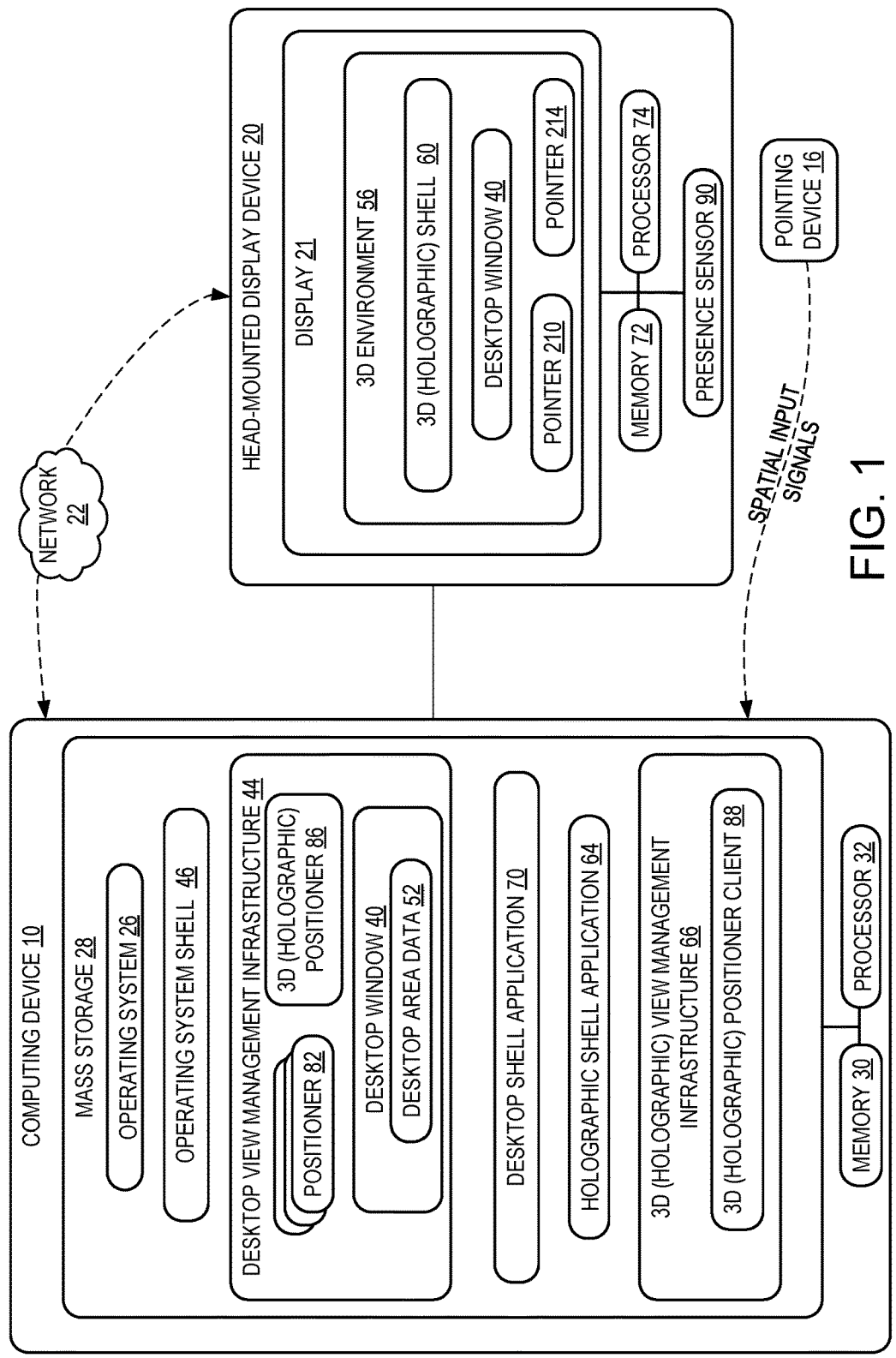
FIG. 1 shows a schematic view of a computing device and head-mounted display device for processing spatial input signals according to examples of the present disclosure.

FIG. 1 illustrates a schematic view of a computing device 10 that processes spatial input signals from a pointing device 16 to enable user interaction with desktop shell(s), other applications and virtual content displayed in a three-dimensional environment according to examples of the present disclosure. Computing device 10 is communicatively coupled to an HMD device 20 comprising a display 21 that enables users to view and/or interact with virtual content in different display contexts. In some examples, the computing device 10 may be communicatively coupled to the HMD device 20 via a wired connection. Additionally or alternatively, the computing device 10 may employ a wireless connection to the HMD device 20 via WiFi, Bluetooth, or any other suitable wireless communication protocol.

In some examples, the computing device 10 and HMD device 20 may be communicatively coupled to a network 22. The network 22 may take the form of a local area network (LAN), wide area network (WAN), wired network, wireless network, personal area network, or a combination thereof, and may include the Internet.

Computing device 10 includes an operating system 26 comprising instructions that may be stored in mass storage 28, loaded into memory 30 and executed by a processor 32 to perform one or more of the methods and processes described herein. As described in more detail below, computing device 10 also includes other applications and infrastructure components comprising instructions that are stored in mass storage 28, loaded into memory 30 and executed by a processor 32. Additional details regarding the components and computing aspects of the computing device 10 are described in more detail below with reference to FIG. 14.

Figure 2:
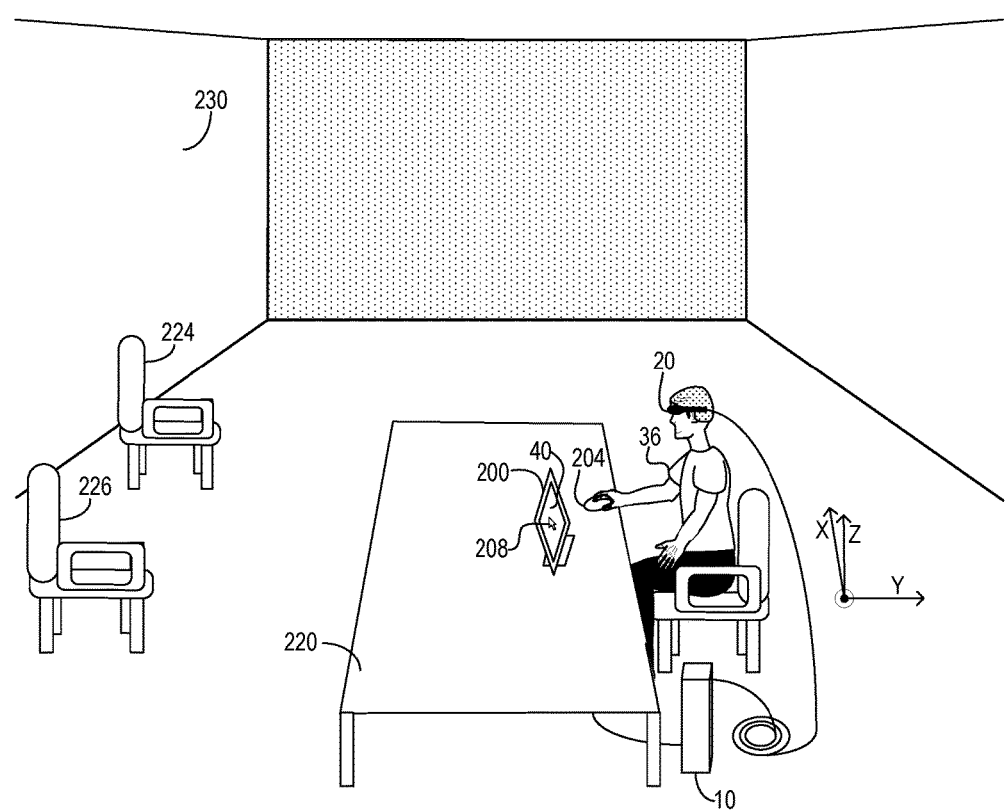
FIG. 2 shows a user wearing a head-mounted display device of FIG. 1 according to an example of the present disclosure.

With reference also to FIG. 2, in some examples a user 36 may use computing device 10 with a monitor 200 that displays a desktop window 40 representing the operating system shell. A desktop view management infrastructure 44 may generate and display the desktop window 40. As shown in FIG. 1, the desktop window 40 may comprise desktop area data 52 that comprises applications, utilities and other components of the operating system 26 with which a user may interact in a displayed client area, such as a client rectangle. In the example of FIG. 2, the user 36 may move a pointing device in the form of mouse 204 to control a displayed pointer 208 and interact with applications and components of the operating system 26 via desktop window 40.

Figure 3:
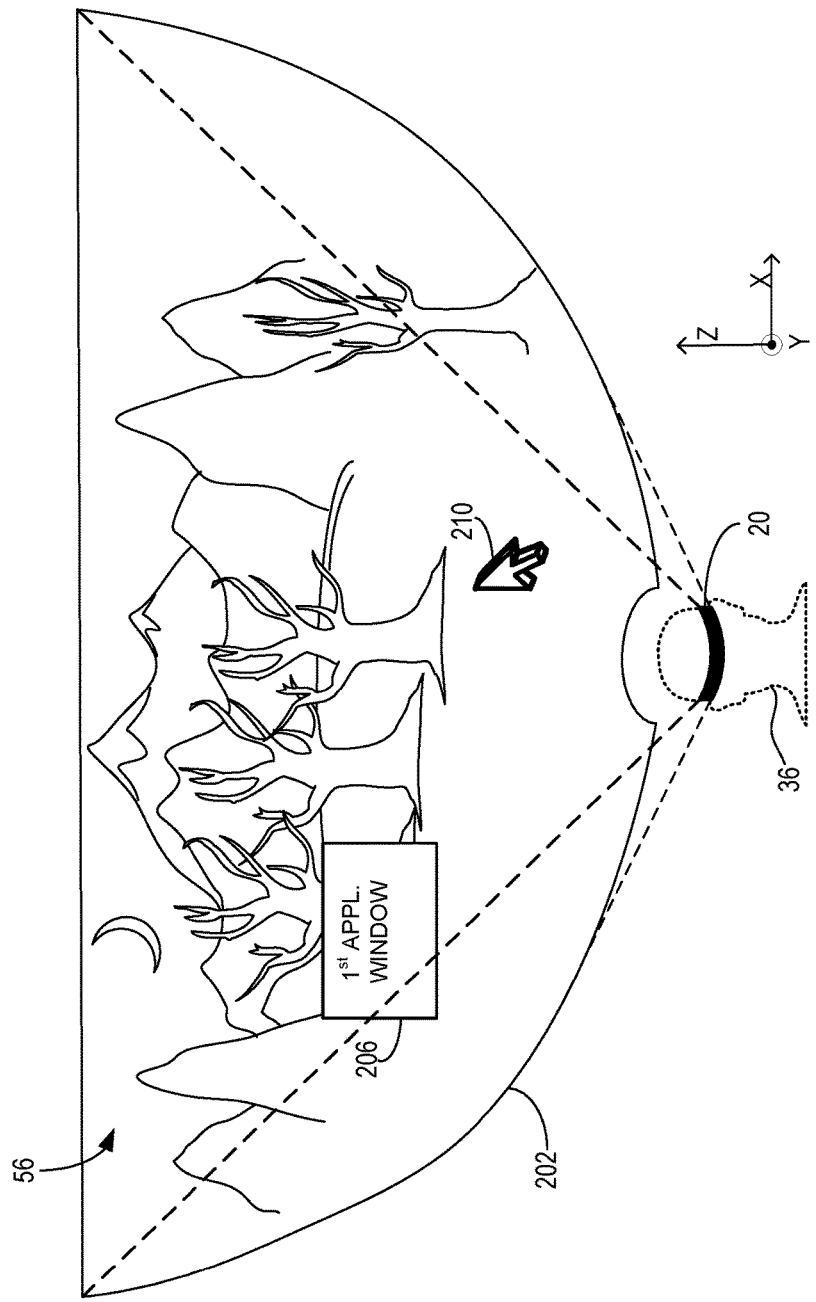
FIG. 3 shows a user viewing a fully virtual three-dimensional environment according to an example of the present disclosure.

With reference again to FIG. 1, in some examples a user may desire to use an HMD device 20 to view and interact with a virtual representation of the desktop window 40 representing the operating system shell 46 and displayed within a three-dimensional environment 56. In one example, the HMD device 20 may comprise an opaque, non-see-through display that presents to the user a fully virtual, three-dimensional environment with no direct view of a real-world environment. With reference now to FIG. 3, in one example the HMD device 20 may display to user 36 a three-dimensional environment 56 in the form of a fully virtual forest that includes trees and mountains. In this example, the user 36 also launches an application that displays a first application window 206 in the three-dimensional environment 56. The HMD device 20 provides the user 36 with a field of view of the virtual environment that is defined by a frustum 202 of space in front of the user. It will be appreciated that in other examples the field of view of an HMD device may comprise other shapes and volumes.

With reference again to FIG. 1, the three-dimensional environment 56 may correspond to a three-dimensional (holographic) shell 60 that is generated via a holographic shell application 64. As described in more detail below, view management of the holographic shell 60 may be performed by a three-dimensional (holographic) view management infrastructure 66.

With reference again to FIG. 3, in some examples the HMD device 20 may display a three-dimensional pointer 210 that may be selectively controlled by spatial input signals received from a pointing device 16, such as mouse 204. In selected contexts and as described in more detail below, two-dimensional movement of the mouse 204 along X and Y axes (see FIG. 2) may be translated into three-dimensional movement of the three-dimensional pointer 210 in the three-dimensional environment 56. In some examples, when the three-dimensional pointer 210 is targeting three-dimensional content, empty space or an inactive desktop window, spatial input signals from the mouse 204 may be ignored. In these examples, the three-dimensional pointer 210 may be controlled by other user input modalities, such as gaze detection using a targeting ray and/or gesture detection.

In some examples, spatial input signals from the mouse 204 may be used to locate the three-dimensional pointer 210. In one example, the three-dimensional pointer 210 may be projected onto the inner surface of a fixed-radius cylinder or sphere (not displayed) having its center at the user 36. The spatial input signals may be translated to move the pointer 210 around the concave surface of the cylinder or sphere. In some examples, the user's gaze direction determines a targeting ray that initially positions the pointer 210. Spatial input signals from mouse 204 may be used to modify the location of the targeting ray and pointer 201. In some examples, if the pointer 210 collides with virtual content in the three-dimensional environment 56, the pointer may be moved closer to the user 36 to overlap the virtual object or other content.

With continued reference to FIG. 3, when the three-dimensional pointer 210 hit-tests a selected location on the first application window 206, the three-dimensional hit-test location may be converted into a two-dimensional hit test location on the surface of the application window. In other words, the X-Y-Z coordinates of the selected location within the coordinate space of the three-dimensional environment 56 are converted into X-Z coordinates of the hit-test location within a two-dimensional coordinate space on the two-dimensional surface of the first application window 206. Such two-dimensional coordinates are then injected into the application generating the application window 206. The application then processes the coordinates in the same manner as if the pointer and first application window were displayed and managed in the desktop window 40.

Figure 4:
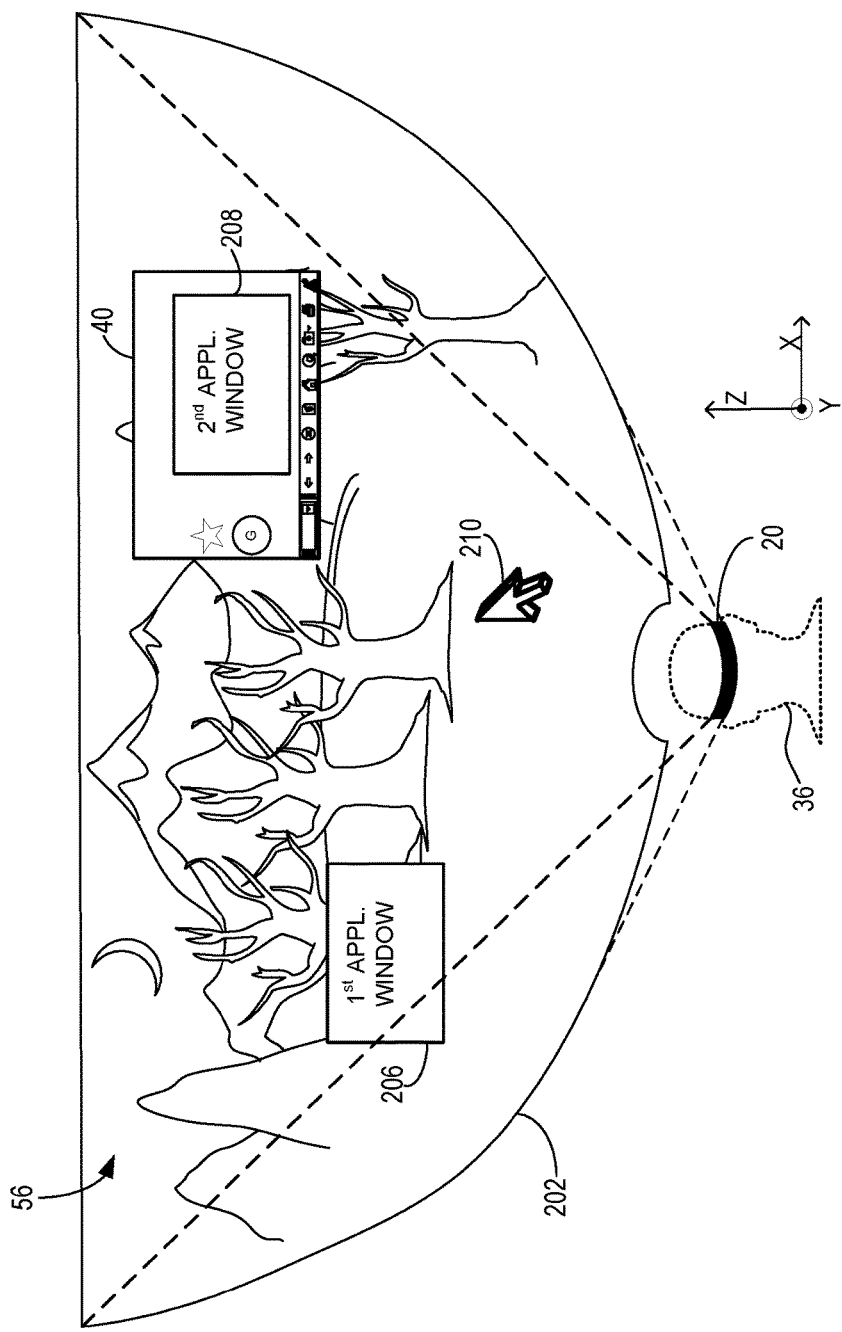
FIG. 4 shows the user of FIG. 3 viewing a desktop window in the three-dimensional environment according to an example of the present disclosure.

With reference now to FIG. 4, the user 36 may provide input to the HMD device 20 requesting display of the user's desktop from computing device 10. In response, the HMD device 20 may display a desktop window 40 representing the operating system shell 46 within the three-dimensional environment 56. In this example, the desktop window 40 includes a second application window 208 corresponding to another application that is running on the user's desktop. With reference also to FIG. 1, a desktop shell application 70 stored on computing device 10 may generate and manage display of the desktop window 40 in the three-dimensional environment 56. In other examples, the desktop shell application 70 may be stored in a mass storage of the HMD device 20, loaded into memory 72 and executed by processor 74 of the HMD device.

From inside the three-dimensional environment 56, the desktop shell application 70 may create a portal into the user's desktop on computing device 10. As described in more detail below, the desktop shell application 70 may seamlessly bridge interactions and transitions between displayed pointers, three-dimensional environments and desktop windows displayed within the environments.

The desktop shell application 70 may utilize a plurality of modes to manage the routing of spatial input signals from a pointing device 16. For example, in a regular application mode a pointer is displayed as a three-dimensional pointer, and the desktop shell application 70 may process spatial input signals in a manner similar to conventional applications. For example, when multiple desktops are available and a user is trying to switch which desktop to duplicate, spatial input signals are not routed to any desktop and are processed by the desktop shell application 70.

Figure 5:
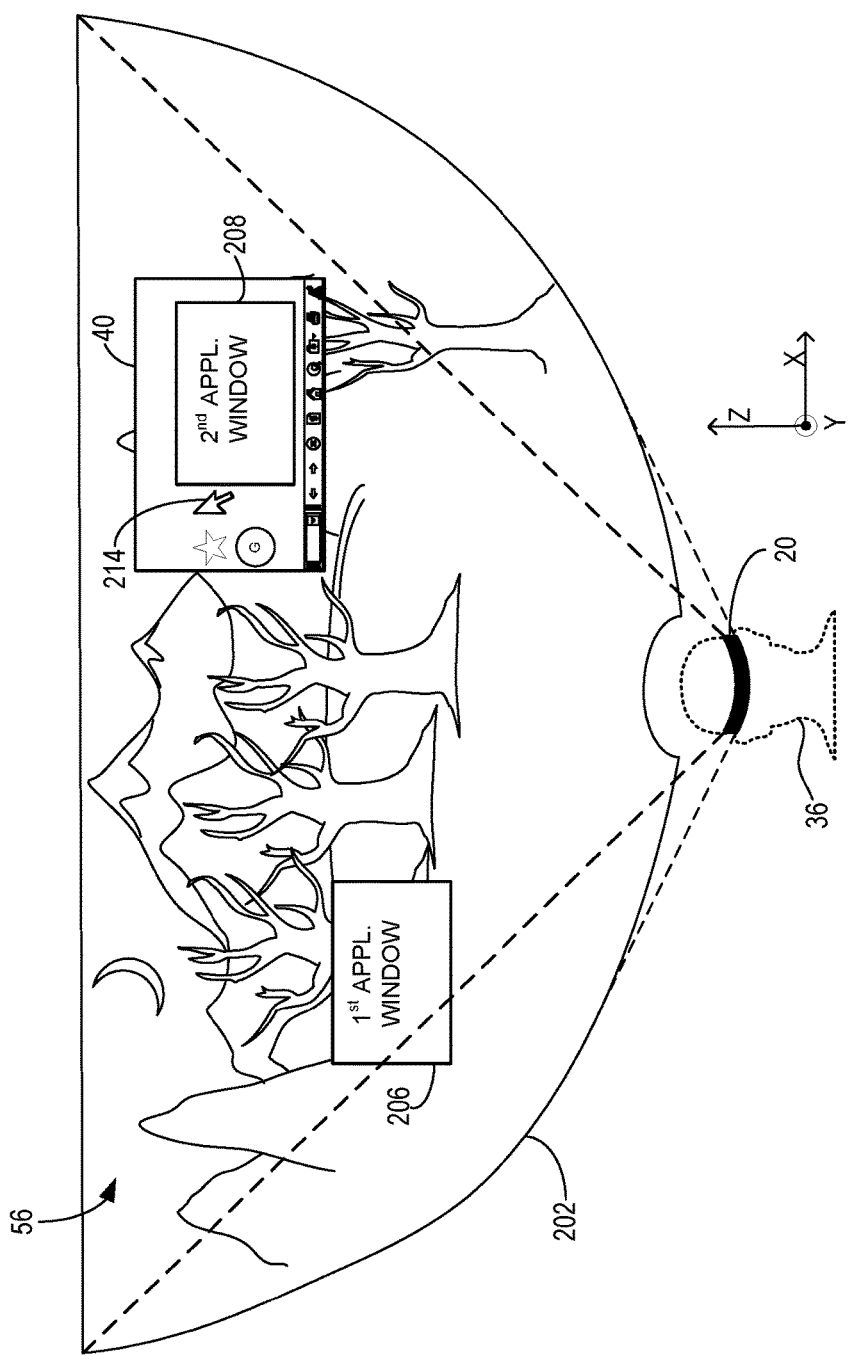
FIG. 5 shows the user of FIG. 3 viewing the desktop window and controlling a pointer according to an example of the present disclosure.

In a desktop duplication mode, the spatial input signals are forwarded to a desktop window. This mode may be activated when the three-dimensional pointer 210 hit tests a specified client area of the application. With reference now to FIG. 5, in this example the client area is represented by the rectangular boundary area of the desktop window 40. Accordingly, when the system determines that the three-dimensional pointer 210 crosses into the desktop window 40, the desktop duplication mode may be activated. When the desktop duplication mode is activated, the three-dimensional pointer is hidden and a two-dimensional pointer 214 is drawn at the location where the three-dimensional pointer hit tests the desktop window 40.

To configure these modes, the desktop shell application 70 may call into the three-dimensional (holographic) shell 60 to set routing properties for spatial input signals on the component that is hosting the corresponding visuals. In this manner, spatial input signals from a pointing device may be mapped natively into the holographic shell 60. Information provided to the component may include application view identification data to identify which view receives the spatial input signals when the displayed pointer is transitioning from a two-dimensional environment to a three-dimensional environment. Other information provided may include location data for the desktop window 40. For example, when a three-dimensional hit test is converted to a regular application two-dimensional hit test, the location data is further processed using these values to convert the data to the appropriate desktop coordinates for the two-dimensional pointer.

With continued reference to FIG. 5, when the two-dimensional pointer 214 is displayed within the desktop window 40, spatial input signals received from the pointing device 16 are translated into two-dimensional motion of the pointer within the desktop window. In this manner, the user 36 may interact with elements displayed in the desktop window 40 via the HMD device 20.

As noted above, in current systems when a virtual representation of a desktop is displayed in a three-dimensional environment, movement of a pointer and corresponding user interaction is confined to the area within the desktop window. Thus, the user is prevented from using the pointing device to interact with content outside the desktop window.

In examples of the present disclosure, the desktop shell application 70 may be configured to process spatial input signals in a manner that allows a pointer to freely travel between a desktop window 40 displayed within a three-dimensional environment 56 and the surrounding three-dimensional environment. Advantageously, the present system enables a user to seamlessly interact with everything displayed in the three-dimensional environment. For example and as described in more detail below, when the desktop shell application 70 determines that input from the pointing device 16 is targeted over the desktop window 40, the user's experience using the device to interact with elements of the desktop window is the same as with using the device to interact with the desktop displayed on a physical monitor, such as monitor 200 of FIG. 2. Should the user desire to interact with other content outside the desktop window 40, the user may simply move the pointer over the edge of the window into the surrounding three-dimensional space and interact with other content in the three-dimensional environment.

Figure 6:
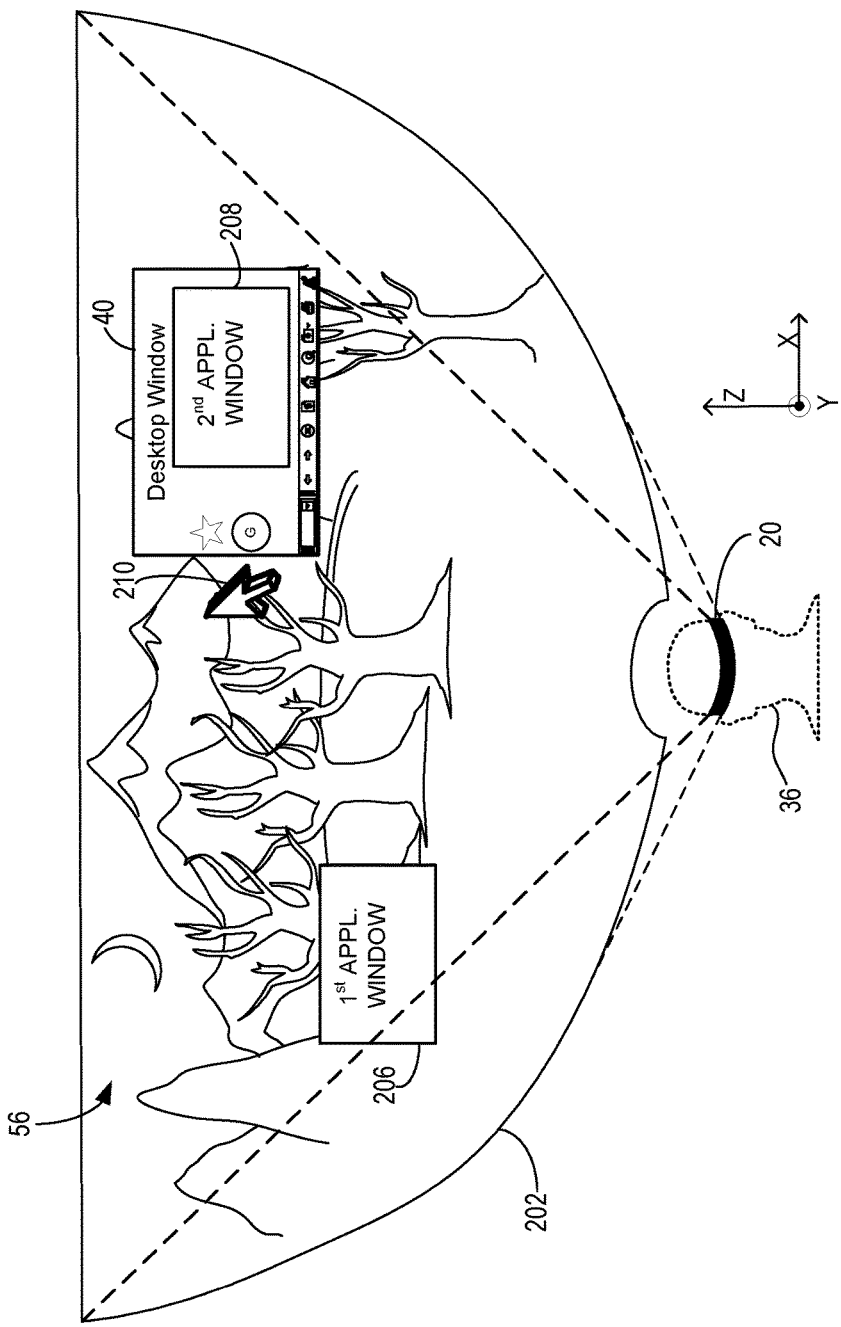
FIG. 6 shows the user of FIG. 3 viewing the desktop window and controlling a pointer according to an example of the present disclosure.

In one example and with reference again to FIGS. 2 and 5, a compositing window manager may receive and process mouse events from the mouse 204. The compositing window manager may perform hit testing to determine that the pointer is located within the desktop window 40. Accordingly, the two-dimensional pointer 214 may be displayed at this location, while the three-dimensional pointer 210 is not displayed. With reference now to FIG. 6, when the location of the two-dimensional pointer crosses the boundary area of the desktop window 40 into the surrounding three-dimensional environment 56, the two-dimensional pointer is replaced with the three-dimensional pointer 210 at the corresponding location. Additionally, when the location of the two-dimensional pointer crosses this boundary, spatial input signals from the mouse 204 are then routed to the holographic shell 60 and translated into three-dimensional motion of the three-dimensional pointer 210.

In some examples, movement of the three-dimensional pointer 210 may be limited to the field of view presented to the user by the HMD device 20. For example and with reference also to FIG. 2, where the user inadvertently moves the mouse 204 far to the right on desk 220, the three-dimensional pointer 210 may remain displayed at a right boundary of the frustum 202 representing the field of view of the user via the HMD device 20. In this manner, and by confining display of the pointer to within the field of view of the HMD device 20, the pointer may be conveniently maintained within the user's view, regardless of spatial input signals received from a pointing device.

In some examples, the modes for handling the two-dimensional and three-dimensional pointers also may be switched upon the change of the foreground window. For example, when the foreground window changes and the newly active window is in a different space than the previous foreground window (e.g., two dimensions versus three dimensions), a pointer mode switch may be performed. In some examples, the three-dimensional (holographic) view management infrastructure 66 may monitor foreground window changes.

Figure 7:
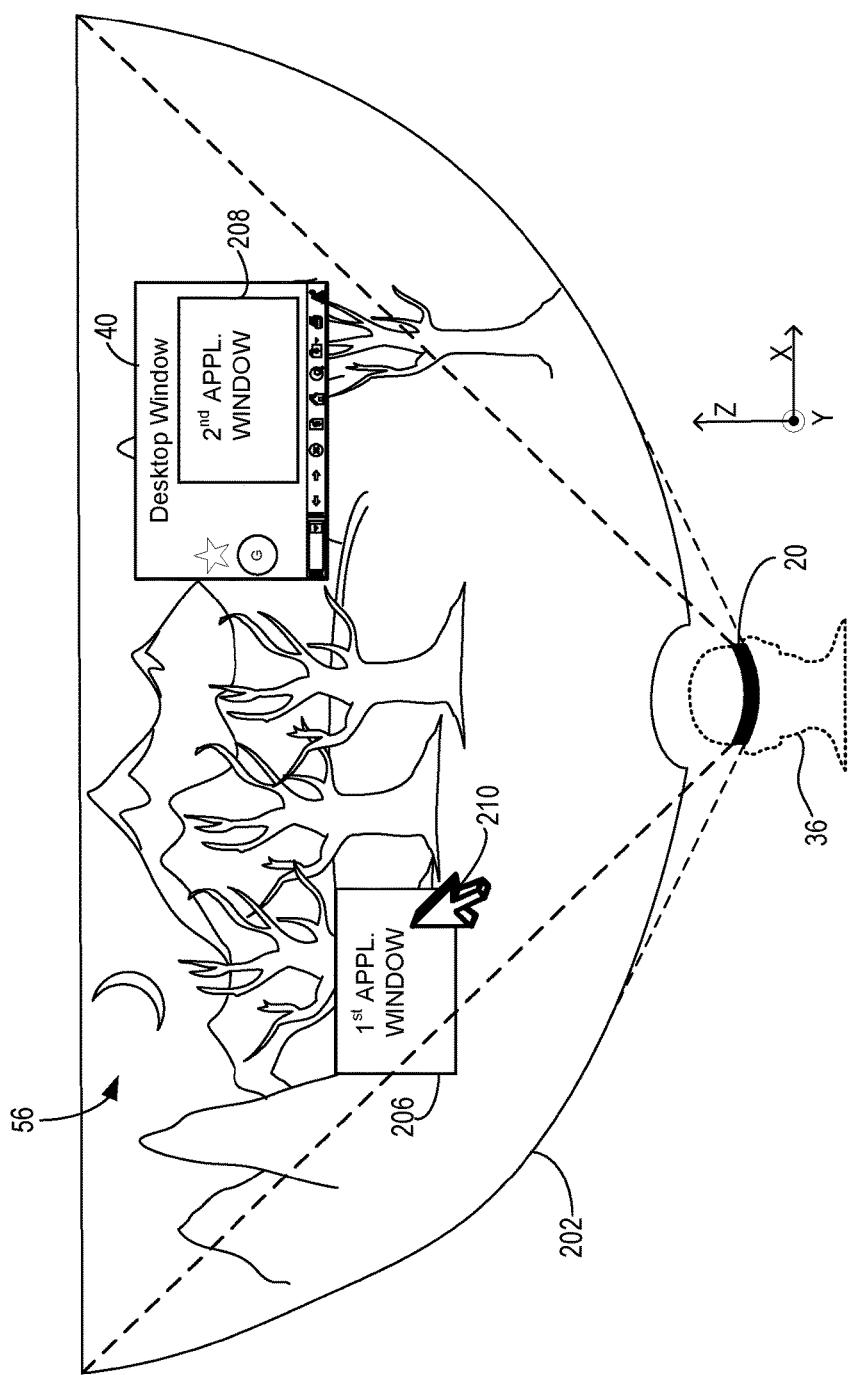
FIG. 7 shows the user of FIG. 3 viewing the desktop window and controlling a pointer according to an example of the present disclosure.

While navigating in the three-dimensional environment 56 with the three-dimensional pointer 210, the user may interact with other displayed content that is managed by the holographic shell application 64 as opposed to the operating system shell 46. With reference to FIG. 7 and as noted above, the first application window 206 may correspond to an application launched via the holographic shell application 64 in the three-dimensional environment 56. As described above, the user 36 may use the three-dimensional pointer 210 to interact with the first application window 206.

In a similar manner, the user 36 may easily and conveniently switch from interacting with the non-desktop, three-dimensional environment 56 to interacting with the user's desktop via the desktop window 40. For example, the system may determine that the location of the three-dimensional pointer 210 moves from outside the boundary of the desktop window 40 to inside the window. In response, the translation of the spatial input signals may be changed from three-dimensional motion of the three-dimensional pointer 210 to two-dimensional motion of the two-dimensional pointer 214 within the desktop window 40. Further and as described above, the three-dimensional pointer may be hidden and the two-dimensional pointer 214 displayed.

Figure 8:
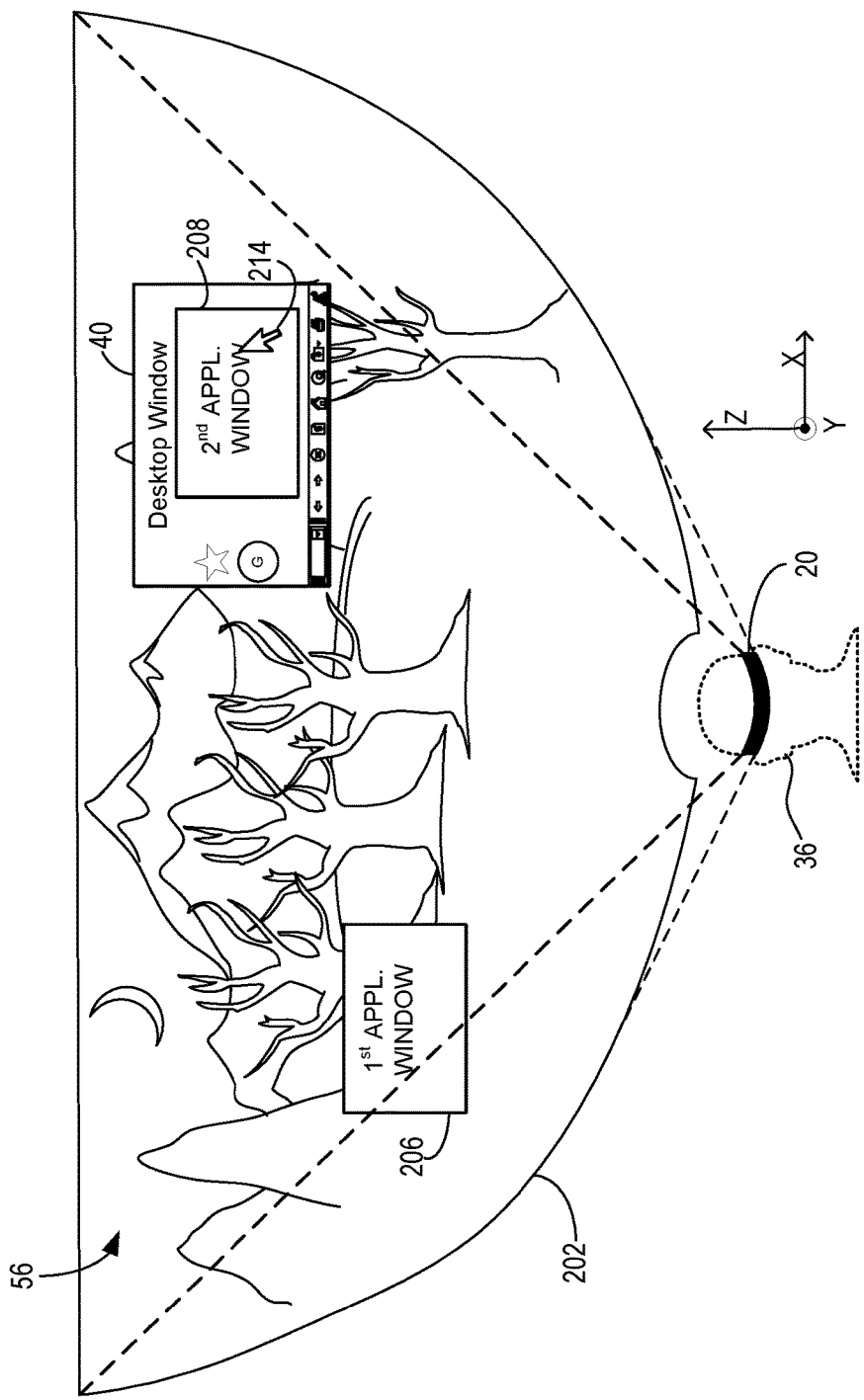
FIG. 8 shows the user of FIG. 3 viewing the desktop window and controlling a pointer according to an example of the present disclosure.
Figure 9:
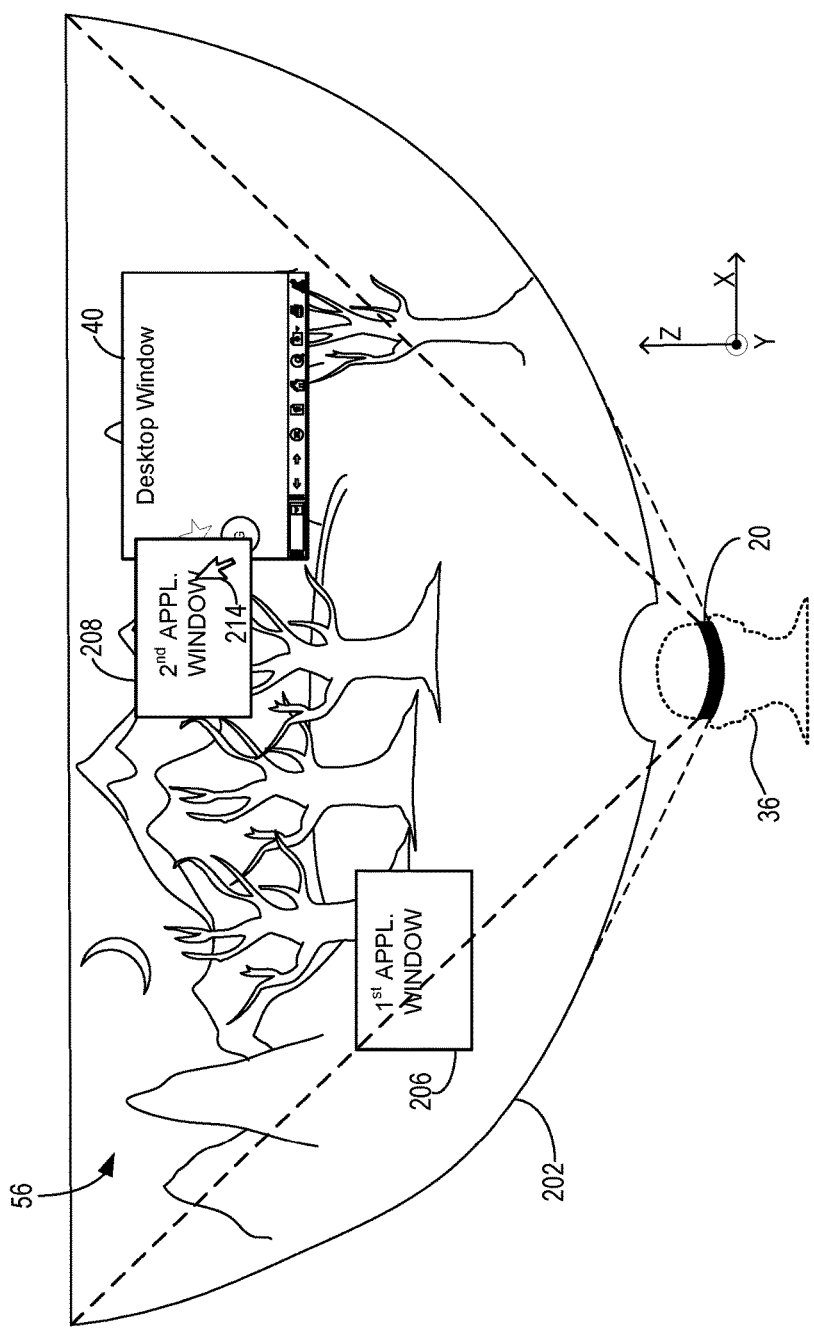
FIG. 9 shows the user of FIG. 8 controlling the pointer to move an application window according to an example of the present disclosure.

In some examples and with reference now to FIG. 8, while displaying the two-dimensional pointer 214 hit-testing a second application window 208 located within the desktop window 40, a user selection of the application window may be received. For example, the user 36 may press and hold a button on the mouse 204 to select the second application window 208. With reference now to FIG. 9, the user 36 may move the second application window 208 outside the boundary of the desktop window 40 via interaction with the mouse 204. In response to determining that the user moves the second application window 208 outside the boundary, view management of the second application window may be transitioned from the operating system shell 46 to the three-dimensional (holographic) shell 60 corresponding to the three-dimensional environment 56.

Figure 10:
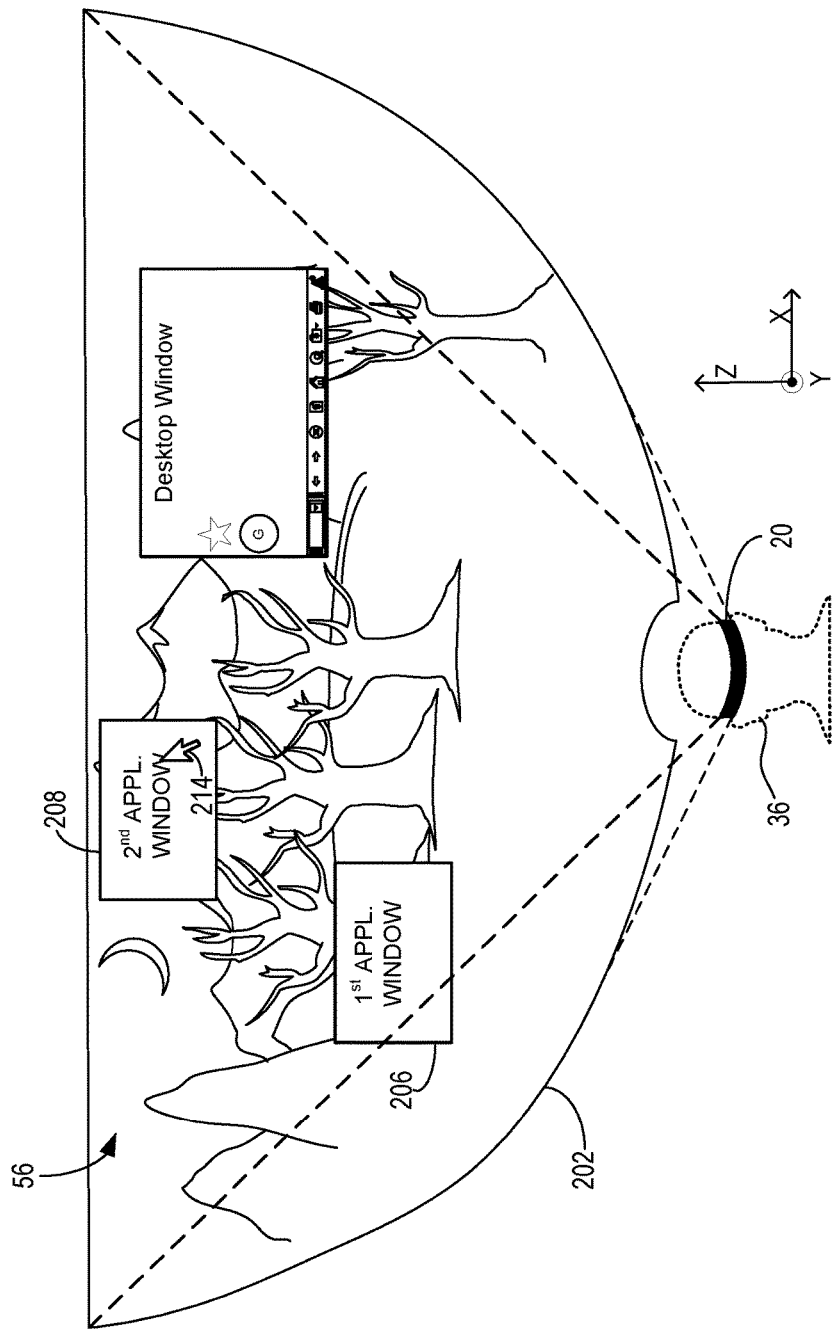
FIG. 10 shows the user of FIG. 8 controlling the pointer to move an application window according to an example of the present disclosure.

In this manner, different view states of the second application window 208 and its corresponding application may be easily transferred from the desktop window 40 representing operating system shell 46 to the three-dimensional environment 56 and three-dimensional (holographic) shell 60. Accordingly, and with reference now to FIG. 10, the disclosed configurations enable a user to 'drag-and-drop' applications from the two-dimensional desktop window 40 to elsewhere in the three-dimensional environment 56.

In some examples and with reference again to FIG. 1, an application's views may be managed by utilizing a plurality of positioners 82 that correspond to different view states. In these examples, a plurality of positioners 82 may be utilized to provide semantics for application hand-off and migration between positioners. The positioners may manage the state of an application when it is transferred from one positioner to another, and may configure a new state when that application is received by the new positioner. For example, an application that is transitioning into a full screen mode may be owned initially by a default desktop positioner, and subsequently may have its ownership transferred to a full screen positioner.

In some examples, a three-dimensional (holographic) positioner 86 may mediate with the other positioners 82 in the desktop to retain ownership of an application view while it lives in the three-dimensional environment. Once the view is owned by the three-dimensional (holographic) positioner 86, the view may be managed via a corresponding three-dimensional (holographic) positioner client 88 in the three-dimensional (holographic) view management infrastructure 66. In this layer, the three-dimensional (holographic) positioner client 88 may retain exclusive ownership of the view.

With this configuration, live migration of views between the two-dimensional desktop window 40 and the three-dimensional (holographic) shell 60 is enabled. In this manner, application views may be freely and dynamically migrated between the desktop and the three-dimensional (holographic) shell 60.

In some examples, spatial input signals may be selectively routed from the pointing device 16 to different shells based on determining whether the user is wearing the HMD device 20. In some examples and as described in more detail below, the HMD device 20 may comprise a presence sensor 90 that may detect if a user is wearing the HMD device. When a user is not wearing the HMD device 20, it may be presumed that the user does not desire to view or interact with a three-dimensional environment via the device. Accordingly, where the presence sensor 90 detects that a user is not wearing the HMD device 20, the spatial input signals may be routed to the operating system shell 46.

In other examples, where the presence sensor 90 detects that a user is wearing the HMD device 20, the routing of the spatial input signals may be switched from the operating system shell 46 to the three-dimensional (holographic) shell 60. Additionally and in some examples, based on detecting that the user is wearing the HMD device 20, the system may cease displaying the pointer as two-dimensional content on a separate monitor (such as monitor 200), and may begin displaying the pointer as three-dimensional content with the three-dimensional environment 56. In this manner, when the user begins wearing the HMD device 20, the system may initialize the display of the three-dimensional pointer 214 to enable quick navigation in the three-dimensional environment 56.

In some examples, the pointer may be located within the desktop window 40 and the system may be operating in a desktop duplication mode. As described above, in this mode the spatial input signals are forwarded to desktop window 40. In some examples and while in desktop duplication mode, the system may determine that a full-screen application, such as a game, is launched or is already running on the operating system shell 46. For example, the foreground application on the operating system shell 46 may be a full-screen game.

In some examples, and based on determining that a full-screen application is launched or running on the operating system shell 46, the system may route raw pointing device events to the operating system shell without modification by the interception routine of the three-dimensional (holographic) shell 60. Accordingly, the spatial input signals corresponding to movements of the mouse 204 are not adjusted or otherwise manipulated with respect to the user's viewing angle or other contextual factors. In this manner, the full-screen application receives the unmodified spatial input signals as generated by the user via the mouse, to thereby replicate the same user interaction experience as would be generated via the operating system shell 46.

Figure 11:
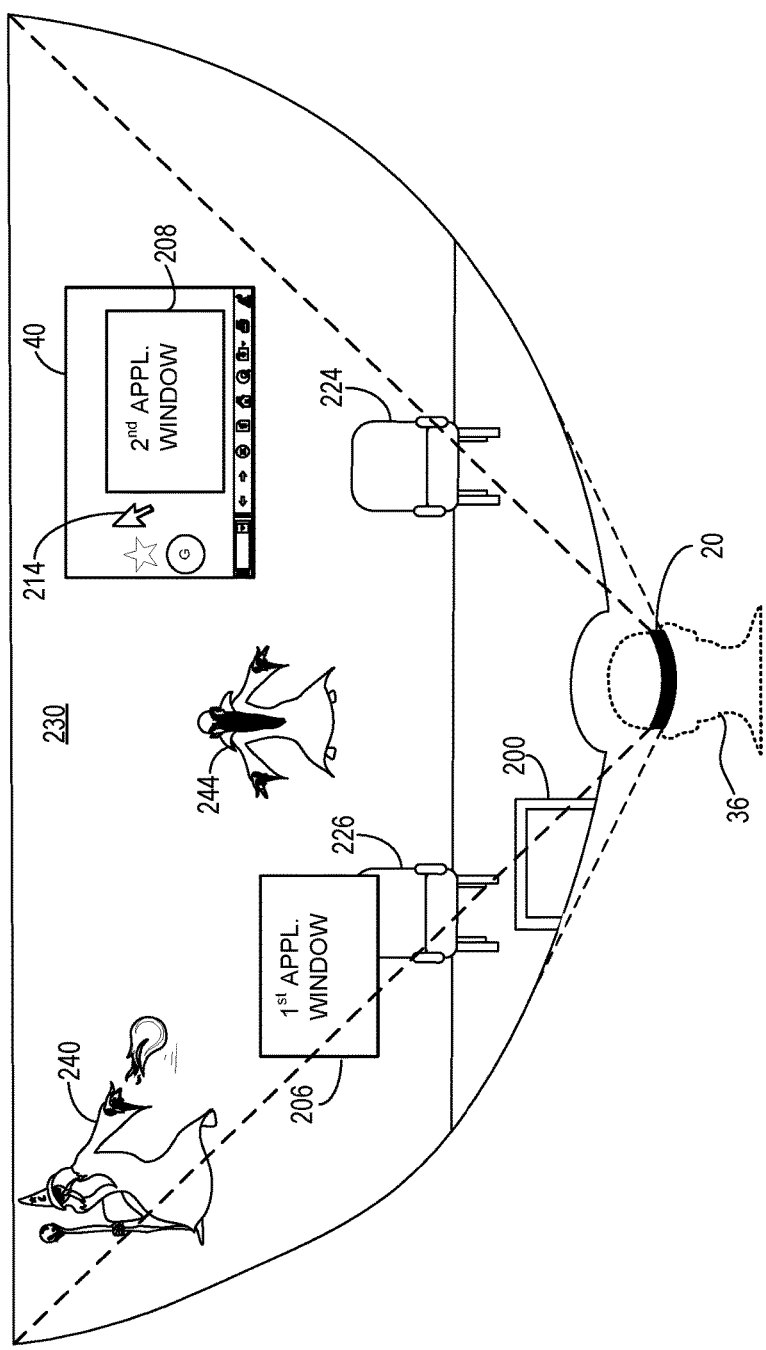
FIG. 11 shows a user viewing a partially virtual three-dimensional environment according to an example of the present disclosure.

With reference now to FIG. 11, in some examples the above-described methods for processing spatial input signals and correspondingly managing interactions in three-dimensional environments may be implemented via HMD devices comprising an at least partially transparent display. In these examples, the HMD device 20 presents a partially virtual three-dimensional environment in which the user views her real-world environment along with virtual content displayed to appear within the environment.

For example and with reference also to FIG. 2, FIG. 11 shows user 36 wearing an HMD device 20 that comprises an least partially transparent display. In the field of view of the HMD device, the user 36 can see a portion of the monitor 200, the two chairs 224, 226 and the wall 230 behind the chairs. The HMD device 20 also displays virtual content that appears to be located within the real-world physical environment of the user 36, thereby creating a partially virtual three-dimensional environment. For example, the HMD device 20 may display the desktop window 40, two-dimensional pointer 214 and $1^{st}$ application window 206 as described above. In some examples the HMD device 20 also may display other virtual content, such as holograms of wizards 240 and 244.

Figure 12:
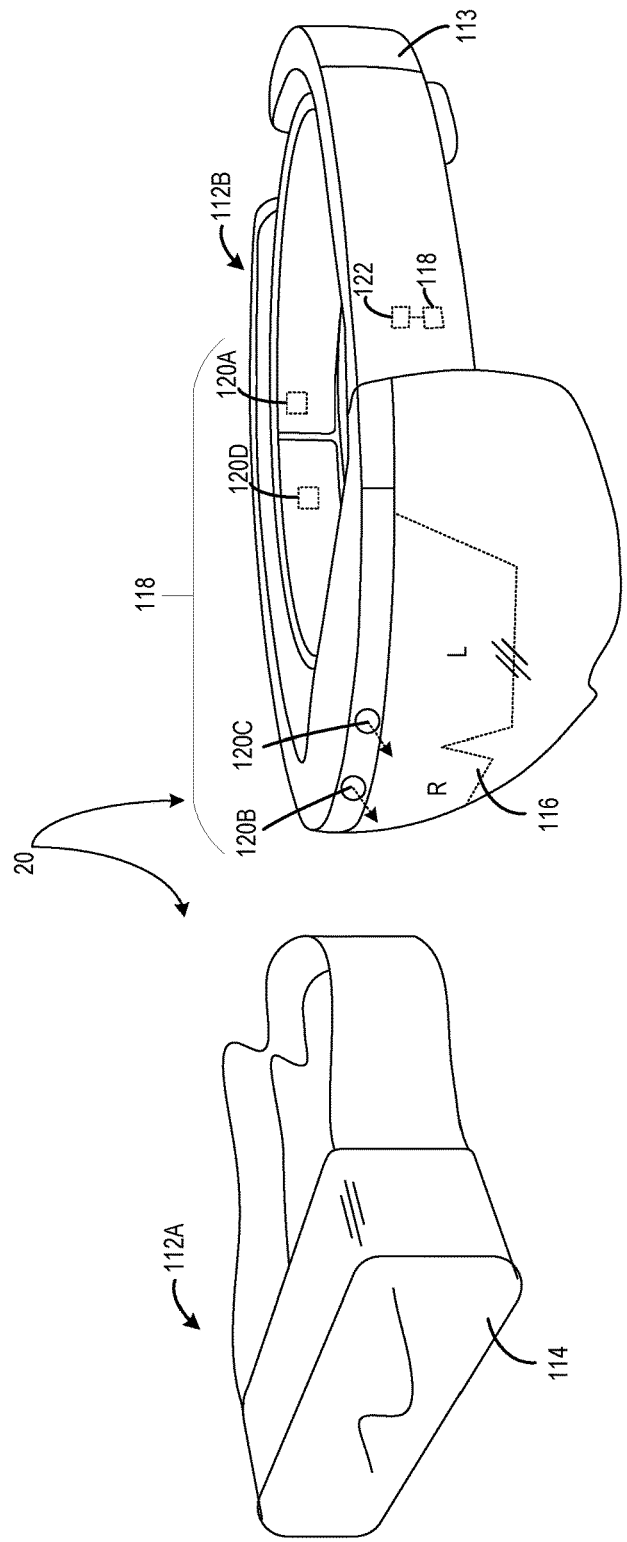
FIG. 12 shows two examples of head-mounted display devices according to examples of the present disclosure.

FIG. 12 illustrates two examples of HMD devices 20 that may be used to practice aspects of the present disclosure. One example of an HMD device 20 is a virtual reality HMD device 112A that includes an opaque, non-see-through display 114. Another example of an HMD device 20 is an augmented reality HMD device 112B that comprises an at least partially transparent display 116. It will be appreciated that the following descriptions of sensors and systems may apply to both the augmented reality HMD device 112B and the virtual reality HMD device 112A.

In the example of FIG. 12, each of the example HMD devices 112A and 112B has a construction that includes a frame 113 that wraps around the head of the user to position a display close to the user's eyes. The frame 113 may support additional components such as, for example, a processor 118 and input devices 120. The processor 118 includes logic and associated computer memory 122 configured to provide image signals to the display 116, to receive sensory signals from input devices 120, and to enact various control processes described herein. The frame of virtual reality HMD device 112A may include a rigid portion and an elastic portion, whereas the frame 113 of augmented reality HMD device 112B may be substantially rigid around its circumference.

Various suitable display technologies and configurations may be used to display images via the displays of the HMD devices. For example, in virtual reality HMD device 112A, the display 114 may be an opaque display, such as a non-see-through Light-Emitting Diode (LED) display, a Liquid Crystal Display (LCD), or any other suitable type of opaque or otherwise non-see-through display. In augmented reality HMD device 112B, the display 116 may be an at least partially transparent display that is configured to enable a wearer of the augmented reality HMD device 112B to view physical, real-world objects in the physical environment through one or more partially transparent pixels displaying virtual object representations. For example, the display 116 may include image-producing elements such as, for example, a see-through Organic Light-Emitting Diode (OLED) display.

As another example of a transparent display, the augmented reality HMD device 112B may include a light modulator on an edge of the display 116. In this example, the display 116 may serve as a light guide for delivering light from the light modulator to the eyes of a wearer. In other examples, the display 116 may utilize a liquid crystal on silicon (LCOS) display. The display 116 may include both a left L and right R display in a stereoscopic display configuration. The left L and right R displays each display a view of an augmented reality scene from the perspective of the user's corresponding eye. By viewing the augmented reality scene through the left L and right R displays, the user will perceive virtual objects as being located at particular depths in the real world.

The input devices 120 may include various sensors and related systems to provide information to the processor 118. Such sensors may include, but are not limited to, an inertial measurement unit (IMU) 120A, one or more image sensors 120B, and one or more ambient light sensors 120C. The one or more outward facing image sensors 120B may be configured to capture and/or measure physical environment attributes of the physical environment in which the augmented reality HMD device 112B is located. In one example, the one or more image sensors 120B may include a visible-light camera configured to collect a visible-light image of a physical space. Additionally and as noted above, the input devices 120 may include a presence sensor 120D that detects whether a user is wearing the HMD device. In one example, the presence sensor 120D may comprise an inwardly-facing image sensor configured to determine whether the user's head is adjacent to the sensor, which indicates the user is wearing the HMD device.

In one example of the augmented reality HMD device 112B that includes a display 116 having a transparent display type, the position and/or orientation of the augmented reality HMD device 112B relative to the physical environment may be assessed so that augmented-reality images may be accurately displayed in desired real-world locations with desired orientations. In both augmented reality HMD device 112B and virtual reality HMD device 112A, the IMU 120A may be configured to provide position and/or orientation data to the processor 118. The orientation derived from the sensor signals of the IMU may be used to display one or more holographic images with a realistic and stable position and orientation.

The processor 118 may include a logic processor and the two example HMD devices may include volatile memory and non-volatile storage, as discussed in more detail below with respect to the example computing system 300 of FIG. 14.

FIGS. 13A and 13B illustrate a flow chart of a method 250 for processing spatial input signals from a pointing device according to examples of the present disclosure. The following description of method 250 is provided with reference to the software and hardware components described above and shown in FIGS. 1-12. It will be appreciated that method 250 also may be performed in other contexts using other suitable hardware and software components.

With reference to FIG. 13A, at 252 the method 250 may include displaying a pointer within a desktop window that represents an operating system shell generated by the computing device, wherein the desktop window and the pointer are displayed via a head-mounted display device within a three-dimensional environment. At 254 the method 250 may include receiving the spatial input signals from the pointing device. At 256 the method 250 may include translating the spatial input signals into two-dimensional motion of the pointer within the desktop window. At 258 the method 250 may include determining that a location of the pointer moves outside the desktop window. At 260 the method 250 may include, based on determining that the pointer location moves outside the desktop window, translating the spatial input signals into three-dimensional motion of the pointer displayed via the head-mounted display device within the three-dimensional environment.

At 262 the method 250 may include, based on a location of the pointer being within the desktop window, routing the spatial input signals from the pointing device to the operating system shell. At 264 the method 250 may include, based on determining that the pointer location moves outside the desktop window, routing the spatial input signals from the pointing device to a holographic shell. At 266 the method 250 may include detecting that the user is not wearing the head-mounted display device. At 268 the method 250 may include, based on detecting that the user is not wearing the head-mounted display device, routing the spatial input signals to the operating system shell. At 270 the method 250 may include detecting that the user is wearing the head-mounted display device. At 272 the method 250 may include, based on detecting that the user is wearing the head-mounted display device, switching the routing of the spatial input signals from the operating system shell to a holographic shell.

At 274 the method 250 may include, based on detecting that the user is wearing the head-mounted display device, ceasing to display the pointer as two-dimensional content and beginning to display the pointer as three-dimensional content. At 276 the method 250 may include, wherein the three-dimensional environment comprises a fully virtual environment with no direct view of a real-world environment. At 278 the method 250 may include, wherein the three-dimensional environment comprises a partially virtual environment in which a user views a real-world environment and virtual content via the head-mounted display device. At 280 the method 250 may include determining that the location of the pointer moves from outside the desktop window to inside the desktop window. At 282 the method 250 may include, in response, changing the translation of the spatial input signals from three-dimensional motion of the pointer to two-dimensional motion of the pointer.

At 284 the method 250 may include displaying an application window via a holographic shell within the three-dimensional environment. At 286 the method 250 may include determining that the pointer hit-tests a selected location on the application window. At 288 the method 250 may include converting three-dimensional coordinates of the selected location to two-dimensional coordinates on the application window. At 290 the method 250 may include providing the two-dimensional coordinates to an application generating the application window for processing by the application.

At 292 the method 250 may include, while displaying the pointer hit-testing an application window located within the desktop window that represents the operating system shell, receiving a user selection of the application window. At 293 the method 250 may include determining that the user moves the application window outside the desktop window via interaction with the pointing device. At 294 the method 250 may include, in response to determining that the user moves the application window outside the desktop window, transitioning view management of the application window from the operating system shell to a holographic shell.

At 295 the method 250 may include, while the pointer is within the desktop window, determining that a full-screen application is running on the operating system shell. At 296 the method 250 may include, based on determining that the full-screen application is running on the operating system shell, routing raw pointing device events to the operating system shell without modification. At 297 the method 250 may include confining display of the pointer to within a field of view presented by the head-mounted display device. At 298 the method 250 may include wherein the pointing device comprises a mouse or a touch-sensitive surface.

It will be appreciated that method 250 is provided by way of example and is not meant to be limiting. Therefore, it is to be understood that method 250 may include additional and/or alternative steps relative to those illustrated in FIGS. 13A and 13B. Further, it is to be understood that method 250 may be performed in any suitable order. Further still, it is to be understood that one or more steps may be omitted from method 250 without departing from the scope of this disclosure.

Figure 14:
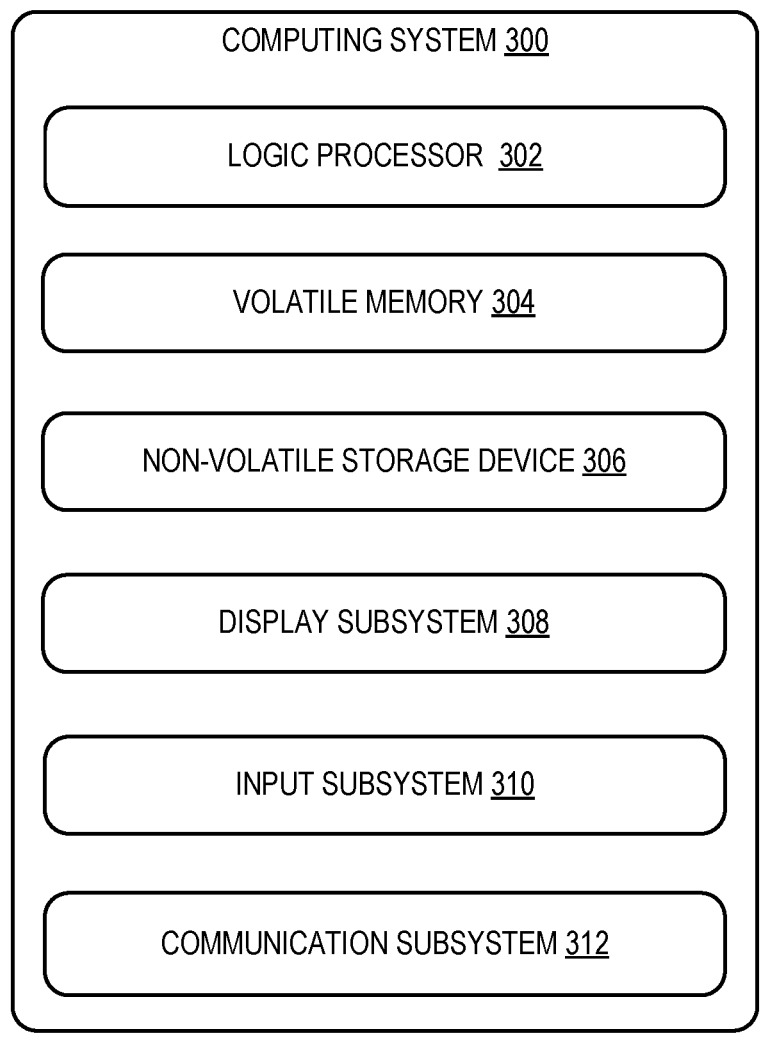
FIG. 14 shows a computing system according to an example of the present disclosure.

FIG. 14 schematically shows a non-limiting embodiment of a computing system 300 that can enact one or more of the methods and processes described above. Computing system 300 is shown in simplified form. Computing device 10 and HMD devices 20 described above may take the form of or include one or more aspects of computing system 300. In some examples, computing system 300 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and HMD devices.

Computing system 300 includes a logic processor 302, volatile memory 304, and a non-volatile storage device 306. Computing system 300 may optionally include a display subsystem 308, input subsystem 310, communication subsystem 312, and/or other components not shown in FIG. 14.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 304 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "program" and "application" may be used to describe an aspect of computing system 300 typically implemented in software by a processor to perform a particular function using portions of volatile memory, which function involves transformative processing that specially configures the processor to perform the function. Thus, a program or application may be instantiated via logic processor 302 executing instructions held by non-volatile storage device 306, using portions of volatile memory 304. It will be understood that different programs and/or applications may be instantiated from the same application, service, code block, object, library, routine, API, function, etc. Likewise, the same program and/or application may be instantiated by different applications, services, code blocks, objects, routines, APIs, functions, etc. The terms "program" and "application" may encompass individual or groups of executable files, data files, libraries, drivers, scripts, database records, etc.

When included, display subsystem 308 may be used to present a visual representation of data held by non-volatile storage device 306. The visual representation may take the form of two-dimensional images and three-dimensional holographic images. As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network, such as an HDMI over Wi-Fi connection. In some embodiments, the communication subsystem may allow computing system 300 to send and/or receive messages to and/or from other devices via a network such as the Internet.

The following paragraphs provide additional support for the claims of the subject application. One aspect provides, at a computing device, a method for processing spatial input signals from a pointing device, the method comprising: displaying a pointer within a desktop window that represents an operating system shell generated by the computing device, wherein the desktop window and the pointer are displayed via a head-mounted display device within a three-dimensional environment; receiving the spatial input signals from the pointing device; translating the spatial input signals into two-dimensional motion of the pointer within the desktop window; determining that a location of the pointer moves outside the desktop window; and based on determining that the pointer location moves outside the desktop window, translating the spatial input signals into three-dimensional motion of the pointer displayed via the head-mounted display device within the three-dimensional environment. The method may additionally or alternatively include, based on a location of the pointer being within the desktop window, routing the spatial input signals from the pointing device to the operating system shell. The method may additionally or alternatively include, based on determining that the pointer location moves outside the desktop window, routing the spatial input signals from the pointing device to a holographic shell. The method may additionally or alternatively include, detecting that the user is not wearing the head-mounted display device; and based on detecting that the user is not wearing the head-mounted display device, routing the spatial input signals to the operating system shell. The method may additionally or alternatively include, detecting that the user is wearing the head-mounted display device; and based on detecting that the user is wearing the head-mounted display device, switching the routing of the spatial input signals from the operating system shell to a holographic shell. The method may additionally or alternatively include, based on detecting that the user is wearing the head-mounted display device, ceasing to display the pointer as two-dimensional content and beginning to display the pointer as three-dimensional content. The method may additionally or alternatively include, wherein the three-dimensional environment comprises a fully virtual environment with no direct view of a real-world environment. The method may additionally or alternatively include, wherein the three-dimensional environment comprises a partially virtual environment in which a user views a real-world environment and virtual content via the head-mounted display device. The method may additionally or alternatively include, determining that the location of the pointer moves from outside the desktop window to inside the desktop window; and in response, changing the translation of the spatial input signals from three-dimensional motion of the pointer to two-dimensional motion of the pointer. The method may additionally or alternatively include, displaying an application window via a holographic shell within the three-dimensional environment; determining that the pointer hit-tests a selected location on the application window; converting three-dimensional coordinates of the selected location to two-dimensional coordinates on the application window; and providing the two-dimensional coordinates to an application generating the application window for processing by the application. The method may additionally or alternatively include, while displaying the pointer hit-testing an application window located within the desktop window that represents the operating system shell, receiving a user selection of the application window; determining that the user moves the application window outside the desktop window via interaction with the pointing device; and in response to determining that the user moves the application window outside the desktop window, transitioning view management of the application window from the operating system shell to a holographic shell. The method may additionally or alternatively include, while the pointer is within the desktop window, determining that a full-screen application is running on the operating system shell; and based on determining that the full-screen application is running on the operating system shell, routing raw pointing device events to the operating system shell without modification. The method may additionally or alternatively include, confining display of the pointer to within a field of view presented by the head-mounted display device. The method may additionally or alternatively include, wherein the pointing device comprises a mouse or a touch-sensitive surface.

Another aspect provides a computing device communicatively coupled to a head-mounted display device, the computing device comprising: a processor; and a memory holding instructions executable by the processor to: display a pointer within a desktop window that represents an operating system shell generated by the computing device, wherein the desktop window and the pointer displayed via the head-mounted display device within a three-dimensional environment; receive the spatial input signals from a pointing device; translate the spatial input signals into two-dimensional motion of the pointer within the desktop window; determine that a location of the pointer moves outside the desktop window; and based on determining that the pointer location moves outside the desktop window, translate the spatial input signals into three-dimensional motion of the pointer displayed via the head-mounted display device within the three-dimensional environment. The instructions executable by the processor may additionally or alternatively include instructions to, based on a location of the pointer being within the desktop window, route the spatial input signals from the pointing device to the operating system shell. The instructions executable by the processor may additionally or alternatively include instructions to, based on determining that the pointer location moves outside the desktop window, route the spatial input signals from the pointing device to a holographic shell. The instructions executable by the processor may additionally or alternatively include instructions to detect that the user is not wearing the head-mounted display device; and based on detecting that the user is not wearing the head-mounted display device, route the spatial input signals to the operating system shell. The instructions executable by the processor may additionally or alternatively include instructions to detect that the user is wearing the head-mounted display device; and based on detecting that the user is wearing the head-mounted display device, switch the routing of the spatial input signals from the operating system shell to a holographic shell.

Another aspect provides a head-mounted display device, comprising: a display; a processor; and a memory holding instructions executable by the processor to: display within a three-dimensional environment a pointer within a desktop window that represents an operating system shell; receive spatial input signals from a pointing device; translate the spatial input signals into two-dimensional motion of the pointer within the desktop window; determine that a location of the pointer moves outside the desktop window; and based on determining that the pointer location moves outside the desktop window, translate the spatial input signals into three-dimensional motion of the pointer within the three-dimensional environment.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. At a computing device, a method for processing spatial input signals from a pointing device, the method comprising:
   displaying a pointer within a desktop window that represents an operating system shell generated by the computing device, wherein the desktop window and the pointer are displayed via a head-mounted display device within a three-dimensional environment;
   receiving the spatial input signals from the pointing device;
   translating the spatial input signals into two-dimensional motion of the pointer within the desktop window;
   determining that a location of the pointer moves outside the desktop window; and
   based on determining that the pointer location moves outside the desktop window, translating the spatial input signals into three-dimensional motion of the pointer displayed via the head-mounted display device within the three-dimensional environment;
   while displaying the pointer hit-testing an application window located within the desktop window that represents the operating system shell, receiving a user selection of the application window;
   determining that the user moves the application window outside the desktop window via interaction with the pointing device; and
   in response to determining that the user moves the application window outside the desktop window, transitioning view management of the application window from the operating system shell to a holographic shell.

2. The method of claim 1, further comprising, based on the location of the pointer being within the desktop window, routing the spatial input signals from the pointing device to the operating system shell.

3. The method of claim 1, further comprising, based on determining that the pointer location moves outside the desktop window, routing the spatial input signals from the pointing device to the holographic shell.

4. The method of claim 1, further comprising:
   detecting that the user is not wearing the head-mounted display device; and based on detecting that the user is not wearing the head-mounted display device, routing the spatial input signals to the operating system shell.

5. The method of claim 1, further comprising:
detecting that the user is wearing the head-mounted display device; and
based on detecting that the user is wearing the head-mounted display device, switching a routing of the spatial input signals from the operating system shell to the holographic shell.

6. The method of claim 5, further comprising, based on detecting that the user is wearing the head-mounted display device, ceasing to display the pointer as two-dimensional content and beginning to display the pointer as three-dimensional content.

7. The method of claim 1, wherein the three-dimensional environment comprises a fully virtual environment with no direct view of a real-world environment.

8. The method of claim 1, wherein the three-dimensional environment comprises a partially virtual environment in which the user views a real-world environment and virtual content via the head-mounted display device.

9. The method of claim 1, further comprising:
determining that the location of the pointer moves from outside the desktop window to inside the desktop window; and
in response, changing the translation of the spatial input signals from three-dimensional motion of the pointer to two-dimensional motion of the pointer.

10. The method of claim 1, further comprising:
determining that the pointer hit-tests a selected location on the application window;
converting three-dimensional coordinates of the selected location to two-dimensional coordinates on the application window; and
providing the two-dimensional coordinates to an application generating the application window for processing by the application.

11. The method of claim 1, further comprising:
while the pointer is within the desktop window, determining that a full-screen application is running on the operating system shell; and
based on determining that the full-screen application is running on the operating system shell, routing raw pointing device events to the operating system shell without modification.

12. The method of claim 1, further comprising confining display of the pointer to within a field of view presented by the head-mounted display device.

13. The method of claim 1, wherein the pointing device comprises a mouse or a touch-sensitive surface.

14. A computing device communicatively coupled to a head-mounted display device, the computing device comprising:
a processor; and
a memory holding instructions executable by the processor to:
display a pointer within a desktop window that represents an operating system shell generated by the computing device, wherein the desktop window and the pointer displayed via the head-mounted display device within a three-dimensional environment;
receive spatial input signals from a pointing device;
translate the spatial input signals into two-dimensional motion of the pointer within the desktop window;
determine that a location of the pointer moves outside the desktop window; and
based on determining that the pointer location moves outside the desktop window, translate the spatial input signals into three-dimensional motion of the pointer displayed via the head-mounted display device within the three-dimensional environment;
while displaying the pointer hit-testing an application window located within the desktop window that represents the operating system shell, receive a user selection of the application window;
determine that a user moves the application window outside the desktop window via interaction with the pointing device; and
in response to determining that the user moves the application window outside the desktop window, transition view management of the application window from the operating system shell to a holographic shell.

15. The computing device of claim 14, wherein the instructions are executable by the processor to, based on the location of the pointer being within the desktop window, route the spatial input signals from the pointing device to the operating system shell.

16. The computing device of claim 14, wherein the instructions are executable by the processor to, based on determining that the pointer location moves outside the desktop window, route the spatial input signals from the pointing device to the holographic shell.

17. The computing device of claim 14, wherein the instructions are executable by the processor to:
detect that the user is not wearing the head-mounted display device; and
based on detecting that the user is not wearing the head-mounted display device, route the spatial input signals to the operating system shell.

18. The computing device of claim 14, wherein the instructions are executable by the processor to:
detect that the user is wearing the head-mounted display device; and
based on detecting that the user is wearing the head-mounted display device, switch a routing of the spatial input signals from the operating system shell to the holographic shell.

19. A head-mounted display device, comprising:
a display;
a processor; and
a memory holding instructions executable by the processor to:
display within a three-dimensional environment a pointer within a desktop window that represents an operating system shell;
receive spatial input signals from a pointing device;
translate the spatial input signals into two-dimensional motion of the pointer within the desktop window;
determine that a location of the pointer moves outside the desktop window; and
based on determining that the pointer location moves outside the desktop window, translate the spatial input signals into three-dimensional motion of the pointer within the three-dimensional environment
while displaying the pointer hit-testing an application window located within the desktop window that represents the operating system shell, receive a user selection of the application window;
determine that a user moves the application window outside the desktop window via interaction with the pointing device; and in response to determining that the user moves the application window outside the desktop window, transition view management of the application window from the operating system shell to a holographic shell.

\* \* \* \* \*